Patented Nov. 27, 1923.

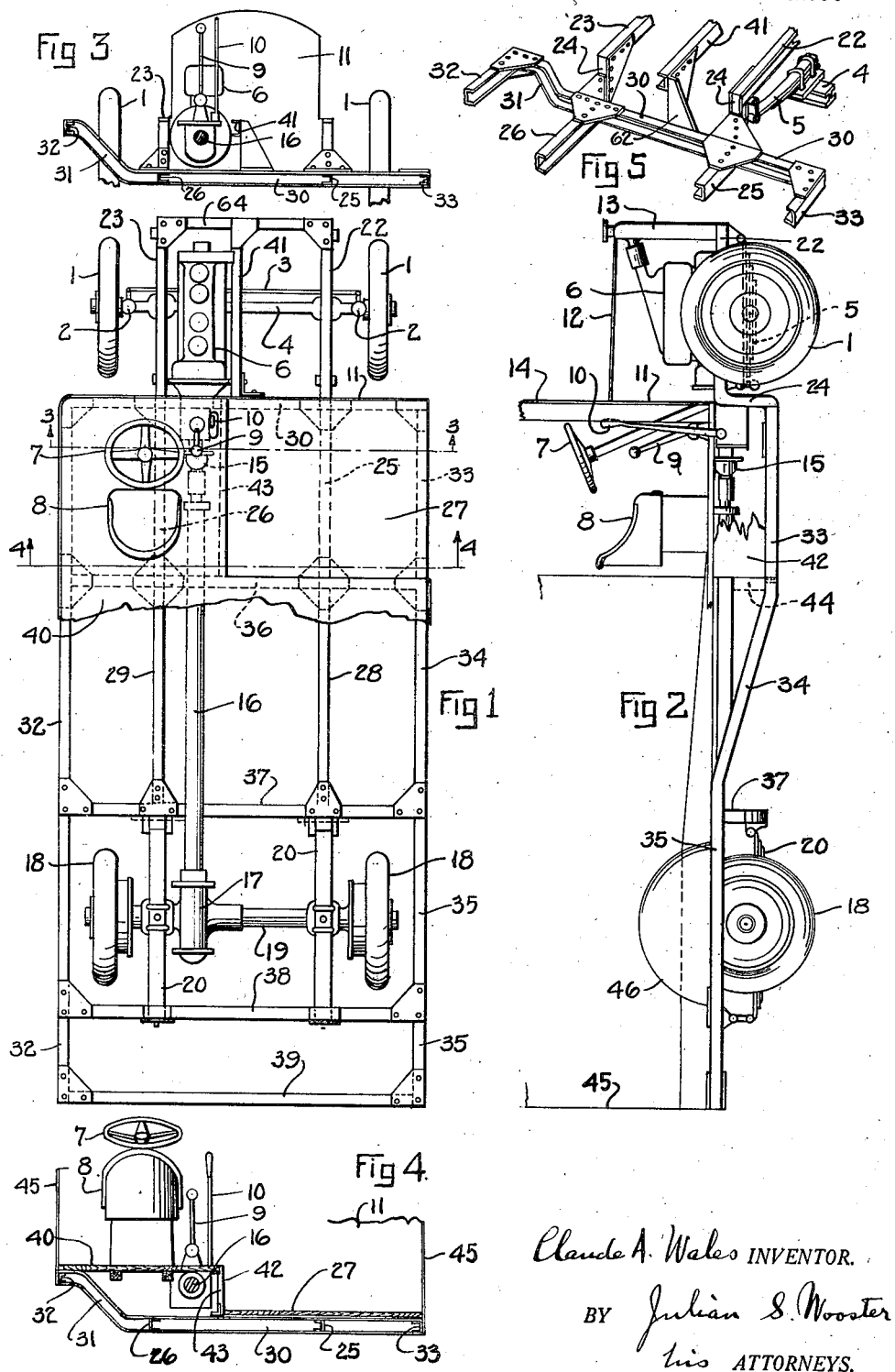

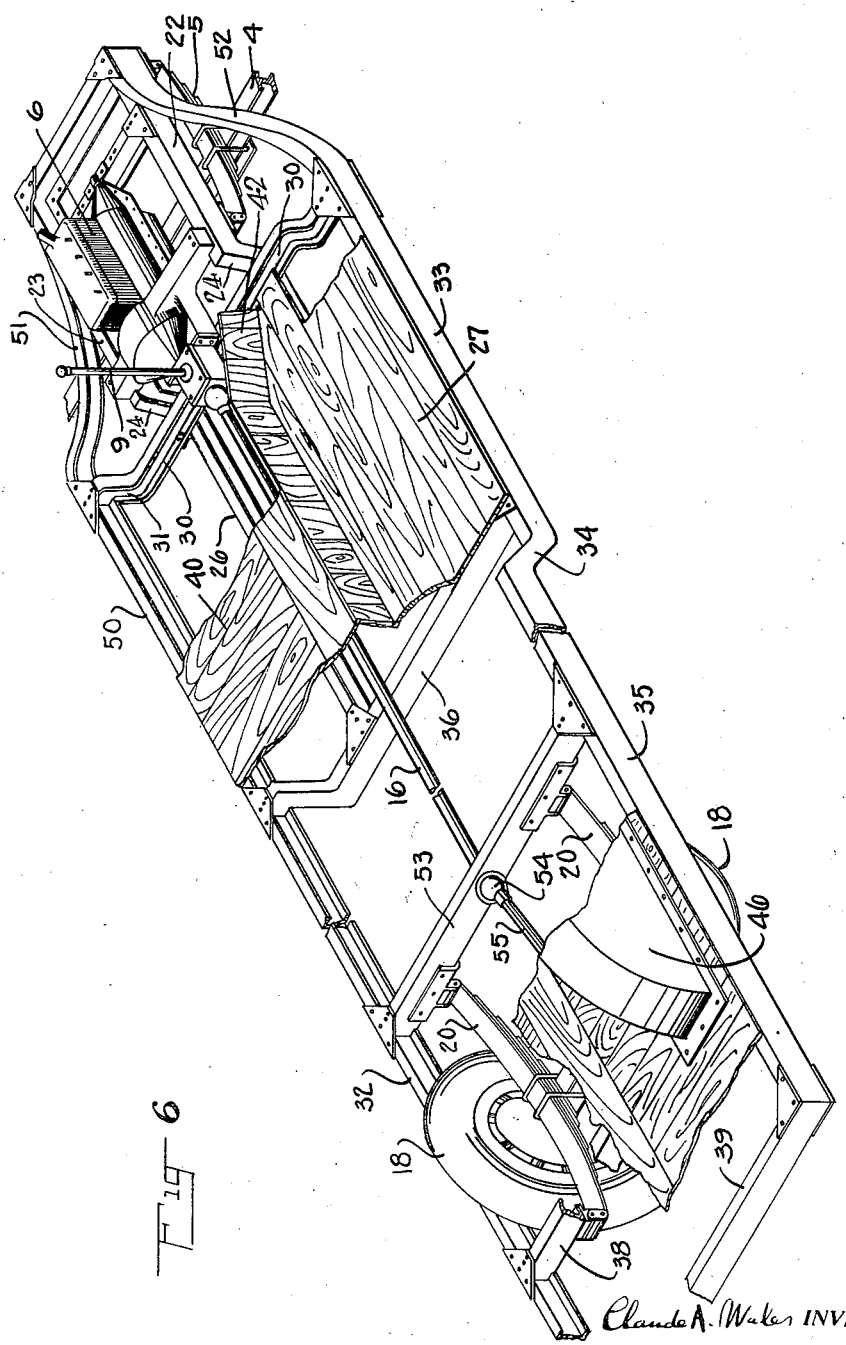

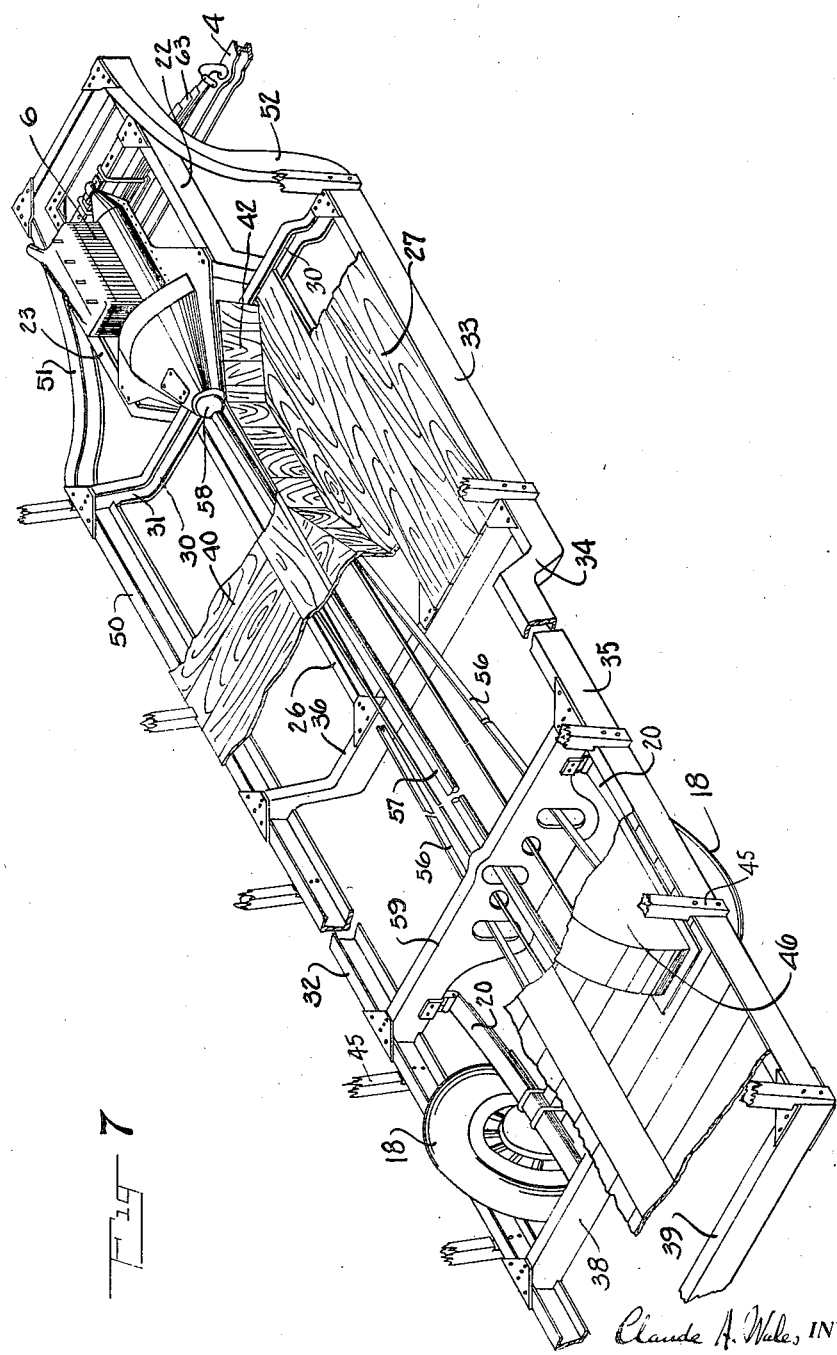

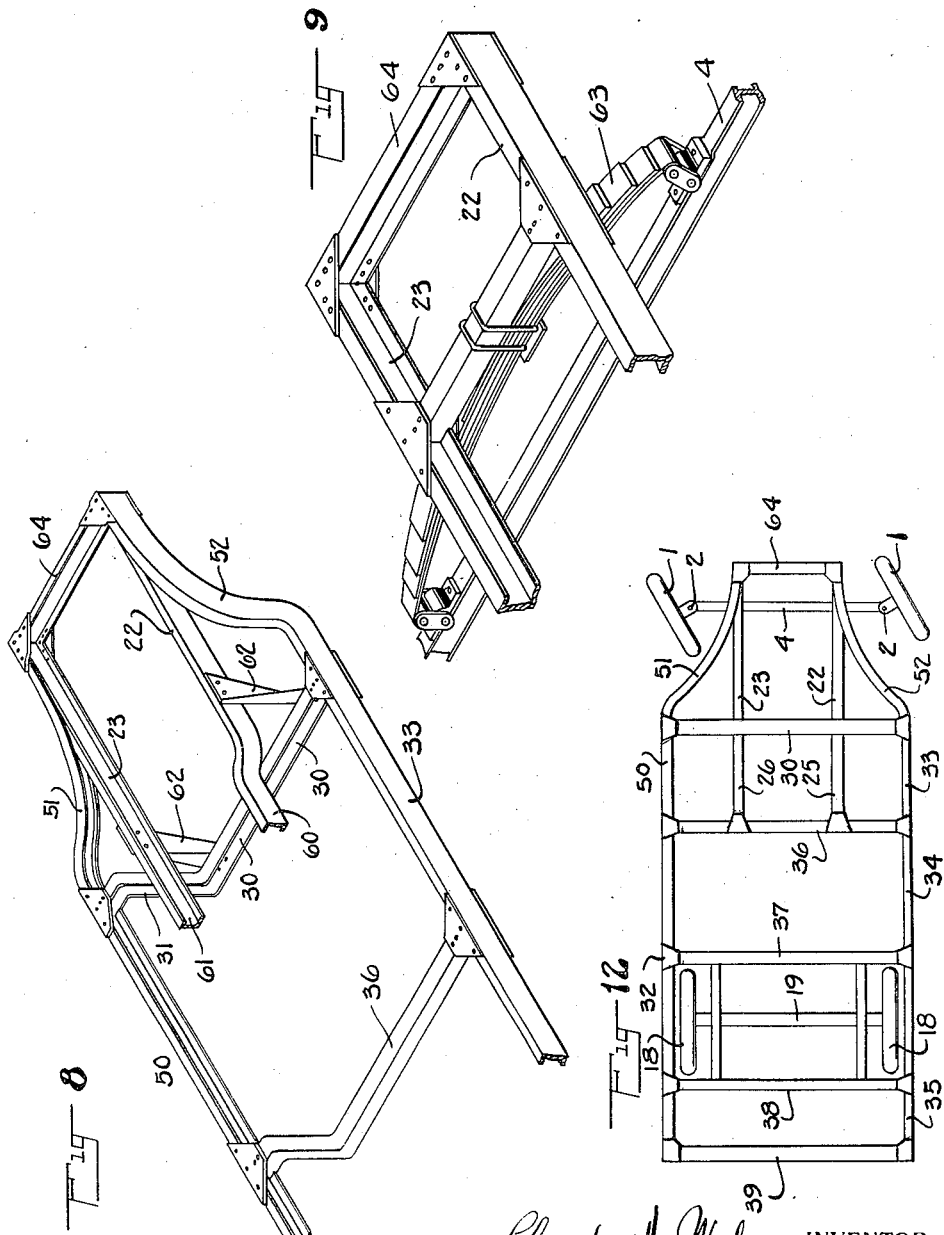

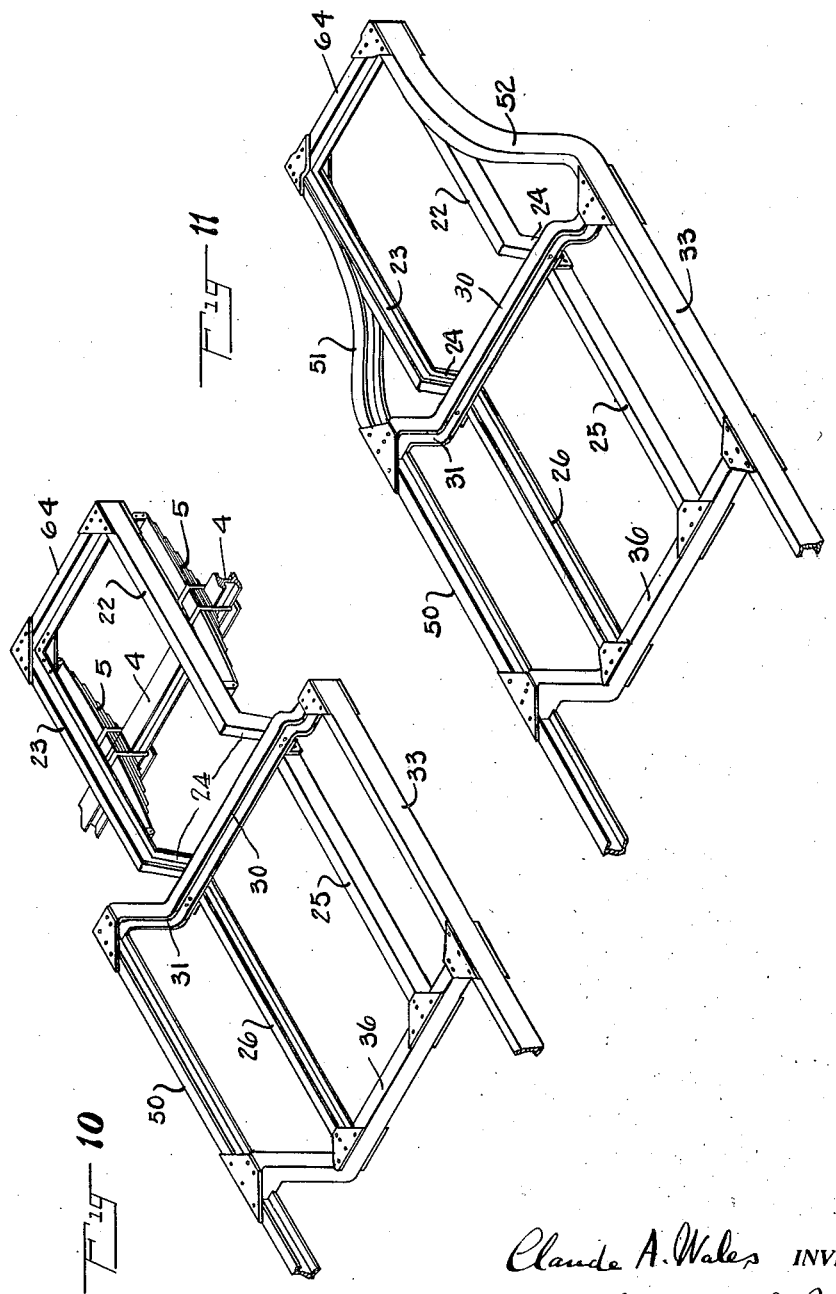

1,475,331

UNITED STATES PATENT OFFICE.

CLAUDE A. WALES, OF BROOKLYN, NEW YORK, ASSIGNOR TO THE PASSENGER LORRY COMPANY, A CORPORATION OF DELAWARE.

ONE-STEP DIRIGIBLE VEHICLE.

Application filed October 3, 1921. Serial No. 504,994.

*To all whom it may concern:*

Be it known that I, CLAUDE A. WALES, citizen of the United States, and resident of Brooklyn, in the county of Kings and State of New York, have invented certain new and useful Improvements in One-Step Dirigible Vehicles, of which the following is a specification.

This invention relates to one step dirigible vehicle, and has particular reference to improvements in vehicles for transportation of passengers, freight, etc., wherein there is ordinarily a closed body with an intermediate pit or platform for the entrance and egress of passengers and freight located substantially within one step of the ground, or at or about the height of an ordinary curb. Laterally of the entrance pit is the driver's seat and controls and rearwardly is the seating or freight space, the body carried directly thereon usually being covered.

By such a vehicle, the delays due to entrance and exit of passengers are very much reduced and traffic can be handled very economically and expeditiously by the driver.

The objects of the invention are to provide a rigid yet strong frame construction which lends itself to cheap quantity production, and so standardized as to be capable of taking different types of power plants, steering mechanism and rear end according to the requirements of the service. Another object of the invention is to provide a frame capable of directly supporting a wide low floor, such floor being of greater width than the wheel tread, which may be standard, and being no higher than reasonably necessary to clear the transmission mechanism; said frame also supporting a platform still lower than the floor, and positioned laterally of (and thus horizontally clearing) the transmission mechanism. Another object is to provide a vehicle frame of this type which will be well narrowed in front so as to provide a front turning radius to enable better operation in traffic turning, etc.

The invention is shown in several forms in the accompanying drawings, wherein—

Figure 1 is a plan view of a vehicle embodying one form of the invention.

Figure 2 a side elevation,

Figure 3 a section on line 3—3 of Fig. 1,

Figure 4 an intermediate sectional elevation taken on the line 4—4 of Figure 1,

Figure 5 a detail of the forward framing showing the engine and spring supports, with pit frame, Figure 6 is a perspective view of a modification, Figure 7 is a perspective view of another modification showing somewhat different springing and power plant.

Figures 8, 9, 10, 11 are modified frame constructions, and

Figure 12 is a plan view of Figure 7.

In all of the forms herein shown the vehicle comprises generally a narrowed front end carrying the usual axle with knuckle pivoted steering wheels, with either cross or longitudinal front springs outside the front frame members, the engine extending longitudinally according to customary vehicle practice either at one side of the vehicle centre as in Figure 1, or centrally thereof. As close to the front wheels as possible the frame is widened out and downwardly deflected or depressed on one side, preferably the right, to provide the entrance pit opened and closed by side doors and located just back of the dash board and wind-shield, the operator and the controls being located on the side opposite the doors just behind the wind-shield. The floor under the driver is preferably elevated at about the normal height of the outside straight frame member on the left, thereby giving the operator an elevated seat, enabling him to conveniently operate the doors and the controls and receive the fares. From the depressed entrance platform located approximately one step above the street or nearly or about at the top of a curb there is a rearward step to the main floor of the vehicle carrying the usual seats, the frame being as wide as the maximum width of the body and being outside and back of the rear wheels as shown. The floor of the body is laid directly on the frame without requiring the usual floor and body stringers, and preferably the body will be built up directly on the frame instead of being separately constructed as is customary practice. This results in a simplification of construction and reduction of parts as well as lightness and facilitates quantity production.

Referring to Figures 1 to 5, 1, 1 represent the front wheels on knuckles 2, connected by cross link 3 in the usual manner and mounted on an axle 4 carrying springs 5, of which only one is shown in Figure 5 for clearness, 6 represents the engine, 7 the steering wheel, 8 the driver's seat, 9 the speed control and 10 the brake, the foot pedals for clutch and service brake being omitted for the sake of clearness. 11 represents the dash, 12 the engine hood, 13 the radiator and 14 the wind-shield above the hood. 15 is the universal joint, 16 the propeller shaft, 17 the housing containing the differential and 18 the rear wheels on rear axle 19 and attached to the frame by rear springs 20, the drive as herein shown being through the springs and of the Hotchkiss type with worm gear reduction.

The forward end of the frame has the function of carrying the engine, front axles, steering gear, radiator, etc., and may be of any suitable or desired construction, consistent with the requirements, being herein shown as consisting of longitudinal members 22, 23, which are bent downwardly as at 24 and thence extend horizontally as 25, 26, for a sufficient distance to constitute the support for the entrance platform 27 thence inclined upwardly and rearwardly as at 28, 29, to the cross member 37. 30 is a cross member connected to members 24, 25, 26, as shown in Figure 5, and having a bend 31, being connected at the left side to the left side or longitudinal frame member 32 which is straight, and in the plane of the main floor of the vehicle, and at the other end to the right side or longitudinal frame member 33, which at its forward end is in the plane of members 25, 26, and thence inclines upwardly as at 34 to the rear portion 35 in the plane of member 32. 36 is a cross member connecting the members 32, 33, 25, 26, and similar to 30, but in the rear of the entrance pit 27. 37, 38 are cross members to which the rear springs 20 are attached and 39 is a rear end member. 40 is the main floor upon which the driver's seat is mounted and itself carried directly on the frame members 32, 35, 37, 38, 39.

The engine 6 is supported on members 23, 41, with the shaft, etc., above cross members 30, 36, with cross member 37 bent downward to clear propeller shaft 16 if a top worm drive is used, or straight if a bottom worm drive is used. In the case of an ordinary bevel gear drive the propeller shaft 16 will pass under a straight cross member 37. This is a matter of design depending upon the particular drive used and not material to this invention, as it is found that this general frame construction is readily adapted to the various types of rear ends now in common use without necessitating increase of height of body floor from the ground, and with various types of known low suspensions.

The vertical sides of the entrance pit 27 are sheathed as at 42, which sheathing is stiffened where necessary to support portions of the floor not directly supported on the main frame members, such stiffeners, for example, being shown at 43, 44. 45 represents the sides and ends of the body and 46 covers in the floor under the seats over the rear wheels. The entire floor behind the entrance pit 27 is thus available for seating and aisle space and allows for large passenger seating capacity within two steps of the ground owing to the low built frame and the entire width of the frame being utilized for flooring without body stringers. As before stated the body, side members, etc., are erected directly on the frame members 30, 32, 33, 34, 35, 39. An advantage of the construction shown in Figure 1 is that by placing the power plant at one side of the medium line, preferably on the left as shown, the entrance pit can be made wider, and somewhat more room thereby obtained to permit the passengers to distribute themselves, without sacrificing the stability or balance of the vehicle as other parts not shown can be disposed so as to even up the balance of the entire vehicle.

Referring to Figure 6, the substantial difference in framing resides in the construction of the left outside frame member 50, which is carried around as at 51 to join the frame member 23, and the carrying forward, upward and inward of member 33 by member 52 to a similar junction with member 22. The curves in 51 and 52 are such as to provide the requisite wheel clearance while furnishing additional strength. Cross member 53 carries a universal joint 54 from which propeller shaft 55 for Hotchkiss drive leads to the rear axle. In this form, the engine and power line can also be offset on the left or centrally disposed according to the usual practice, and the sheathing 42 of the body may be diagonal at the front as shown in order to clear the transmission case of the unit power plant shown.

In Figure 7 the construction is generally like that of Figure 6 except that another type of front axle, engine, and transmission is shown for either worm or bevel gear rear drive, with the vertical sheeting of the pit correspondingly modified. 56 is the rear radius rod construction, 57 the propeller shaft, 58 the universal joint and 59 is a special pressed cross member provided with a deep stiffening flange and with holes as shown through which the shaft, wishbone and brake controls pass.

In Figure 8 the members 22, 23, 30, 33, 36, 50, 51, 52 appear similarly to members similarly numbered in other figures, the members 22, 23, in this case being extended as at 60, 61, to form engine clutch, and transmission supports, and also supports for control levers, etc., and are braced by double angles 62 to the front depressed member 30, forming a very stiff and light frame. These brace members 62 and other similar members are used at other places in the construction where suitable, without special description, as for example, supporting the member 41 and member 30 in Figure 5.

Figure 9 is a detail of front cross spring suspension applicable to the forms shown in Figures 1 and 6, being itself shown applied in Figure 7, 63 being the front spring. The forward end of the frame constitutes a radiator support and also protects the vehicle against damage from collision.

Figure 10 in substance is an amplification of Figure 5, the staying being somewhat simpler as some of the gusset plates shown in Figure 5 are dispensed with. In all cases the front cross member is indicated by 64 on which the radiator will usually be supported and bumpers, etc., where used.

Figure 11 represents a combination of Figures 5 and 6, more especially showing details of Figure 6 and does not require further detailed description.

It will be seen that this invention renders it possible to mount on wheels of standard tread a body of considerably greater width than the tread. The main longitudinal frame members, rear of the forward wheels, are spaced apart the width of the body, and the sides of the body as well as the floor are supported directly upon them. These longitudinal members are disposed sufficiently low to bring to floor almost down to the transmission members, allowing only a reasonable vertical clearance for the same, while one of the longitudinals is depressed still further and carries a lowered entrance platform which extends inwardly partially across the vehicle, and clears the drive shaft by not more than a reasonable horizontal clearance. The laterally adjacent portion of the floor affords space for the driver and controls. The narrowed forward end of the vehicle greatly facilitates travel in congested traffic. The difficulty here involved of transmitting the stress of the forward end suspension back into the rear frame members without putting forward cross frame members 30 in torsion, is met by carrying members 22 and 23 back to one of the cross members to the rear of member 30, such as cross member 36, and thus connecting it to a plurality of cross members. The same result is also accomplished by continuing outside longitudinal frame members 50 and 52 forward, between the forward wheels, offsetting them to clear the latter, and connecting their forward ends to the respective forward ends of members 22 and 23, thus transmitting the stress directly in outside longitudinal members 50 and 52. These constructions are preferably combined, as in Figure 11.

The rigidity of the frame is in no way impaired by thus accommodating it to the advantageous features above described. In many cases where members have been shown as separate and secured together by bolts or rivets, a single part may be forged to shape, and whether such parts are separate or integral, they will be equally within the scope of the invention.

This specification is similar in some respects to my pending applications Serial No. 422,779 for vehicle body, filed November 9, 1920, and Serial No. 452,686 for vehicle frame, filed March 16, 1921.

What I claim is:

1. A motor vehicle comprising a pair of dirigible front wheels and rear driving wheels, an engine mounted in the forward portion of the vehicle, a propeller shaft extending from the engine rearwardly for driving the rear wheels, said engine and shaft being located away from the longitudinal center line of the vehicle, a pair of longitudinal frame members extending the greater part of the length of the vehicle, an entrance platform in the forward portion of the vehicle extending inwardly past the axis of one of said longitudinal frame members to a position adjacent said propeller shaft, the longitudinal frame member past which the platform extends being depressed to support the platform within an easy step of the ground.

2. A one man operated motor bus comprising a pair of longitudinal frame members extending the greater part of the length of the bus, a depressed entrance platform in the forward portion of the vehicle within an easy step of the ground, a driver's seat located substantially opposite said entrance platform, and a second pair of longitudinal members located between the first mentioned longitudinal frame members, at least one of the first mentioned pair and one of the second mentioned pair of longitudinal members being depressed beneath said entrance platform.

3. A motor vehicle comprising in combination an engine mounted in the forward portion of the vehicle, a pair of rear driving wheels, a depressed entrance platform in the forward portion of the vehicle within an easy step of the ground, and extending inwardly to adjacent the longitudinal center of the vehicle, said engine being displaced from the longitudinal center line and located on the side of the vehicle opposite the entrance platform.

4. A motor vehicle having a floor, said vehicle including an entrance platform in the forward portion of the vehicle depressed to within an easy step of the ground and extending inwardly more than half way across the width of the vehicle, said entrance platform lying in a plane within an easy step of the floor of the vehicle.

5. A motor vehicle comprising a pair of dirigible front wheels and a pair of rear driving wheels, a frame comprising a pair of longitudinal members and a pair of longitudinal side frame members outside the first mentioned longitudinal members, one of said side frame members being depressed adjacent the forward portion of the vehicle to support an entrance platform extending inwardly past said side frame member, said side frame member being shaped upwardly and inwardly from said entrance platform to clear the front wheels.

6. A motor vehicle comprising dirigible front wheels and rear driving wheels, a pair of longitudinal engine supporting members, a pair of combined chassis side frame members and body sills a part of one of which is located below the axis of said wheels, a body mounted on the last mentioned members and those members being extended forwardly and inwardly behind the front wheels and braced against the forward portion of said engine supporting members.

7. A motor vehicle comprising a pair of dirigible front wheels and rear driving wheels, a frame having a pair of longitudinal members for supporting an engine, a pair of longitudinal side frame members outside the first mentioned longitudinal members and extending rearwardly to laterally overhang the rear vehicle wheels below the top thereof, cross members bracing said longitudinal frame members, a floor laid directly on said side frame and cross members, at least one of said side frame members, one of the first mentioned longitudinal members, and one of the cross members being depressed to support an entrance platform adjacent the engine support and within an easy step of the ground.

8. A motor vehicle comprising a pair of dirigible front wheels and rear driving wheels, a frame having a pair of longitudinal members for supporting an engine, a pair of longitudinal side frame members outside the first mentioned longitudinal members and extending rearwardly to laterally overhang the rear vehicle wheels below the top thereof, cross members bracing said longitudinal frame members, a floor laid directly on said side frame and cross members, at least one of said side frame members, one of the first mentioned longitudinal members, and one of the cross members being depressed to support an entrance platform adjacent the engine support and within an easy step of the ground, the other of said side frame members being of substantially the same level throughout and shaped inwardly behind a front vehicle wheel and fastened forwardly to said engine support, the depressed side frame member having an upward and inward shape from said platform for bracing to a substantially similar portion of the engine support.

9. A motor vehicle comprising a pair of forward wheels, a pair of rear wheels, axles for said wheels, a pair of longitudinal frame members outside the rear wheels, cross frame members connecting said longitudinal frame members, a pair of longitudinal frame members closer spaced than said first pair and connected to the forward end cross member and extending forward thereof between said forward wheels, supporting means between said axles and said frame members, and means comprising a portion of the first mentioned longitudinal frame members shaped inwardly beyond said forward wheels and braced forwardly and upwardly to a portion of said second mentioned longitudinal frame members for preventing torsion of said forward end cross members in transmission of load from said first longitudinal members into said forward axle.

10. A motor vehicle comprising rear driving wheels, forward steering wheels, a frame supported by said wheels and having longitudinal side members, a power plant mounted on the forward end of the frame and laterally offset from the center line of the vehicle, driving means between said power plant and said rear wheels, and a depressed entrance platform carried by one of said side members between forward and rear wheels and extending partially across the vehicle from the side opposite the engine across and adjacent to said driving means, said side member being depressed adjacent the platform to carry the same.

11. A motor vehicle frame, comprising a pair of longitudinal members connected together by cross members and inwardly offset at their forward ends, a second pair of longitudinal members connected to the respective forward ends of said first pair and extending rearwardly, the rear portions of said second pair being connected to one of said cross members, and one of the longitudinal members of said first pair having an intermediate depression adjacent and to the rear of said offset.

12. A motor vehicle frame, comprising a pair of longitudinal members connected together by cross members and inwardly offset at their forward ends, a second pair of longitudinal members between said first pair connected thereto at their respective forward ends and extending rearwardly of said offset, the rear portion of said second pair being connected to a plurality of said cross members, and one of the longitudinal members of said first pair having an intermediate depression adjacent and to the rear of said offset.

Signed at New York in the county of New York and State of New York this 29th day of September A. D. 1921.

CLAUDE A. WALES.